Feb. 19, 1952   G. DOELTER   2,586,011
METHOD OF PRODUCING A SOFT, FLEXIBLE AND RESILIENT
SURFACE LAYER ON BODIES OF A HARD NONRESILIENT
MATERIAL AND BODIES PRODUCED THEREBY
Filed June 3, 1948
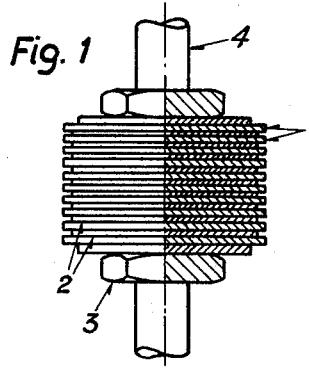
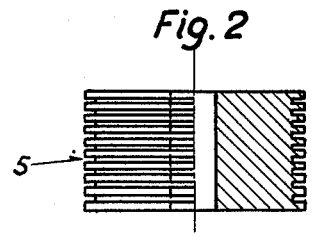
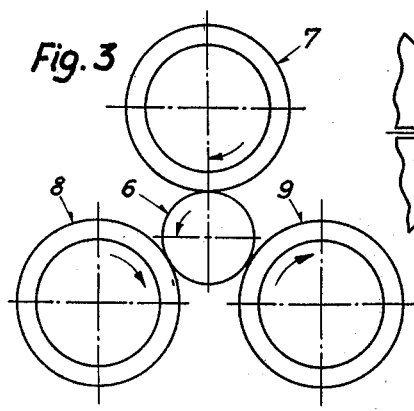
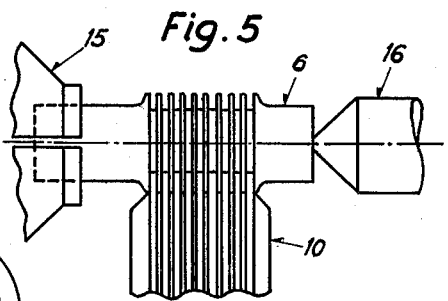
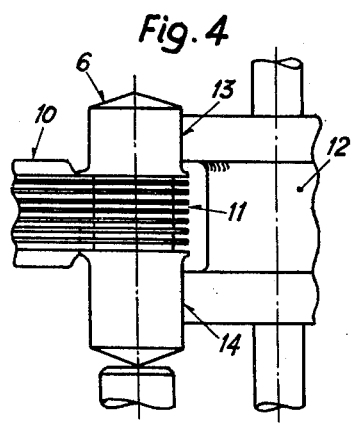
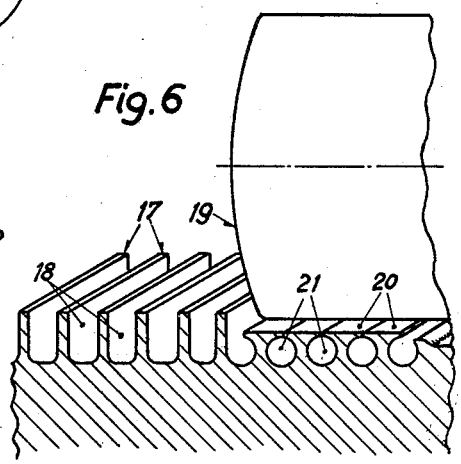
INVENTOR:
Gandolph Doelter
BY
Richard y Geier
ATTORNEYS Patented Feb. 19, 1952

2,586,011

UNITED STATES PATENT OFFICE 2,586,011

METHOD OF PRODUCING A SOFT, FLEXIBLE, AND RESILIENT SURFACE LAYER ON BODIES OF A HARD, NONRESILIENT MATERIAL AND BODIES PRODUCED THEREBY

Gandolph Doelter, Paris, France, assignor to Vadolt Trust, Vaduz, Liechtenstein, a company of Liechtenstein Application June 3, 1948, Serial No. 30,944
In Austria June 11, 1947

3 Claims. (Cl. 29—183.5)

The invention relates to a method for the surface treatment of bodies of hard non-yieldable material, such as, for example, non-ferrous metals or steels, for the purpose of producing a soft, yieldable and flexible surface layer. The invention further relates to bodies having a soft and yieldable surface layer which consists of a hard material capable of being shaped by machining, more particularly of non-ferrous metals or steel with strengths up to 80–100 kg./mm.²

In many cases in the art, the problem is set of making the surface of a body which is hard in itself, e. g. a metallic body, soft and flexible. For example, it may be a question of providing a solution for the following problems:

To avoid an accurate machining of the surfaces of two objects which are to be closely connected with one another, for the purpose of assuring the adhesion of a body consisting of hard material to a rough surface or a surface of any profile, To produce a firm seating of individual parts on or within other parts without utilising keys, pins or like securing means, To produce a yieldable sealing by a soft surface, To permit the possibility of relative movement between two or more bodies by means of a yieldable surface layer, which movement would be impossible without this surface formation, To assure a certain guiding or running in certain directions or to prevent this guiding in other directions, To permit a change of position which would not be possible otherwise without damaging the surfaces or complete destruction.

In the aforementioned cases, it was always necessary hitherto to resort to applying to the hard bodies, materials which possessed the desired properties, such as, for example, lead, rubber and the like. This utilization of extraneous materials, which is inconvenient in itself, led to even more important disadvantages caused by deficiencies in the power of adhesion, the strength properties, resistance capacity and reaction to corrosion, and thus could not be wholly satisfactory.

According to the invention, the surface of the workpiece consisting of hard material is provided, by mechanical working, with a suitable large number of outwardly-closed air chambers which are separated from one another by thin walls.

The bodies of hard material with softened surface layer are so formed, in accordance with the invention, that the surface layer of the body consists of a number of juxtaposed air chambers of suitable cross-sectional shape, the thickness of the partitions at their thinnest point amounting to about half or a quarter of the width of the hollow space and the depth of the surface layer corresponding to the desired thickness of the layer that is to be made soft.

Several examples of how the method in accordance with the invention may be carried into effect are represented diagrammatically in the drawing, wherein:

Fig. 1 is a laminated roller, partly in longitudinal section,

Fig. 2 is a grooved roller, also shown partly in longitudinal section,

Fig. 3 is an arrangement with three grooved rollers in plan view,

Fig. 4 is an arrangement with a laminated roller and a supporting roller,

Fig. 5 is an arrangement with a laminated roller and an object which is rotatably supported, and Fig. 6 is a diagrammatic representation of the compression operation by means of a flattening roller.

The laminated roller according to Fig. 1 is built up from spring steel lamellae or discs 1 and interposed spacing discs 2 of smaller diameter, which are held together by means of threaded nuts 3 and are secured on the shaft 4 of the roller. The grooved roller according to Fig. 2 is made in one piece and is suitably profiled at 5 on its periphery. In carrying out the first stage of operations with an arrangement consisting of three grooved rollers (Fig. 3), the body 6 to be worked is enclosed by three grooved rollers 7, 8, 9 which bear on the surface of the article to be treated, preferably at equal distances from one another, and rotate in a direction opposite to that of the article. With the arrangement according to Fig. 4, a single laminated roller 10 is provided which contacts the body 6 to be worked at that part 11 of its surface that is to be made soft or weakened. The supporting roller 12 lies with its projecting portions 13, 14 on that part of the body 6 that is not to be worked. With the method of working according to Fig. 5, a single laminated roller 10 is again arranged so as to bear on the body 6 that is to be worked; the body itself is rotatably mounted by means of a chuck 15 and a pin 16. The compressing operation on a portion of the worked body 6 is illustrated to a much larger scale in Fig. 6. The ribs or webs 17 and the channels 18 obtained during the first operation with the profiled roller are to be seen at the left-hand end of the workpiece, whereas the action of the flattening roller 19 is to be observed on the right-hand end of the workpiece: the ribs 17 are here compressed together to form a smooth closed surface 20, the channels 18 are bridged over at their upper ends and transformed into closed air chambers 21.

The invention thus makes it possible so to treat the surface of a workpiece consisting of a hard material that it becomes soft and flexible or yieldable without utilizing other soft sealing or yieldable bodies. For this purpose, the hard body is subjected, at the part of its surface that is to be made soft or weak, to a mechanical treatment, e. g. by deformation, in order to provide the surface with a suitably large number of outwardly-closed air spaces separated from one another by thin walls.

The method is carried into effect in two successive operational stages. The first operational stage consists in working on the surface, which is at least roughly smooth, with a rapidly rotating tool, e. g. a profiled roller. In this way, parallel ribs or webs are formed in the surface of the body, which are thereupon compressed in a second stage between flattening rollers and form closed air chambers.

As a profiled roller, there may advantageously be employed a tool which consists of individual spring steel lamellae or discs, between which are inserted spacing discs of smaller diameter. Instead of this tool, there may be used a suitably shaped grooved roller made in one piece. The thickness of the lamellae and the spacing discs disposed between them, or the profiling of the grooved roller, are executed in accordance with the desired fineness and depth of the surface layer that is to be made soft (starting from 0.1 mm.).

According to a further development of the method according to the invention, the roller-shaped tool is brought up to high speeds of rotation, e. g. 4000–5000 revolutions per minute, by a suitable drive and urged under pressure against the body to be treated. In this way, the treated workpiece, if it is symmetrical in rotation, is made to revolve at the same speed, but preferably at an even higher speed. By virtue of the high surface speeds, the profiled surface of the above described roller readily impresses itself in even very hard material and leaves the material of the hard body standing up between the separate lamellae or ribs of the roller as correspondingly shaped ribs or webs. This operation is combined with a strong local heat development which must best be kept within certain limits by cooling with rinsing oil in order to avoid a pressing or cracking of the upstanding material.

This rolling of a surface may, for example, be carried out within a second, even with the hardest steel, since because of the high speed of rotation of the article to be worked, there takes place a plurality of extremely brief applications with the rotating profiled roller.

The treatment by means of profiled rollers can advantageously be effected by several absolutely similar grooved or laminated rollers. In this case, the rollers provided may be applied simultaneously to the body being worked, but at different points thereof.

When using a single profiled roller, the body under treatment is conveniently held against the pressure of the grooved or laminated roller by at least two rotatable supporting rollers. In this case, both the supporting rollers preferably engage the surface portion of the article at points other than where it is being worked.

Moreover, when using a single profiled roller, it has been shown to be desirable for the body under treatment to be rotatably supported away from the surface that is to be made soft, so that both supporting rollers may be entirely dispensed with.

The body, with its surface ribbed by way of the ways above described, is now brought between flattening rollers having a smooth hard surface. According to the invention, these rollers, or at least one of them, also revolve at a high speed. It is possible to use one flattening roller, as well as several such rollers engaging the body being treated at different sides thereof. The flattening process claimed is only capable of being carried out satisfactorily at high speeds of rotation, in order to avoid a straining or breaking, or irregular compression of the fine ribs. Moreover, these are only compressed on their upper edges until the spaces between them are bridged over. In this way, a smooth surface is formed which is somewhat higher than the original was and which possesses the desired properties of yieldability and flexibility until the air chambers and ribs are entirely compressed.

The arrangement of air chambers of any desired cross-sectional shape, e. g. round, oval or angular, and disposed closely adjacent one another in the surface layer, is fundamentally always possible in the bodies formed in accordance with the invention, provided they consist of materials which permit of shaping by turning, that is, mainly of non-ferrous metals or steel with strengths up to 80–100 kg./mm.$^2$. The depth of the channel-shaped air chambers conforms to the thickness of the surface layer to be made soft; these may, for example, be from a few tenths of a millimetre up to several millimetres and preferably have a direct relationship with the thickness of the walls disposed between the air chambers. For example, the thickness of the ribs may constitute a half to a quarter of the diameter, when the cross-section of the air space is approximately circular.

With bodies which are symmetrical in rotation, the air spaces may advantageously consist of annularly extending juxtaposed channels which lie in planes perpendicular to the axis of rotation, but with bodies of other shapes, however, they may consist of parallel channels following the surface shape.

In the articles treated according to the methods of the invention, the hollow spaces which form their surface layers and which are closed towards the exterior (or perhaps only almost completely closed), are substantially more resilient to an alteration in shape or a deformation than the homogeneous material would be, since the uppermost layer of the material thus treated consists solely of thin ribs and walls and consequently has become uniformly porous. The softness is gradually variable by suitable dimensioning of rib thickness and air chamber spacing and is therefore independent of the material. The depth of the treated surface layer determines the thickness of the yieldable material.

By the surface treatment of the invention, it is possible to obtain a complete, tight union of two or more hard, e. g. metallic bodies, which is still yieldable. This union or connection has in itself a certain latitude of movement which would not otherwise be possible at all, or at least only with the risk of damage, or which had to be sought by utilizing other soft substances of a sealing or yieldable nature. Bodies treated in accordance with the invention may be used with advantage, for example, for the following purposes:

For driving axles, pins, bolts or like machine elements in undersized or unworked bores of equally hard or even harder material.

For sealing two hard bodies against a third medium, even with surfaces or profiles which have been roughly or defectively worked, such as shafts, flanges, stuffing boxes, seals and the like.

For obtaining a certain latitude of movement of two or more bodies relative to one another which, owing to too great surface friction or lack of resilience of the one or other body, would otherwise not be possible or only possible by using strong forces or with partial or complete destruction, e. g. binding, roughly-worked pistons, projectiles in a barrel, machine elements on grooves shafts and the like.

I claim:

1. Body of a hard material capable of being shaped by turning, more particularly of metals with strengths up to 80–100 kg./mm.$^2$, characterised by the fact that the surface layer of a cylindrical body consists of a number of annular air chambers disposed adjacent and parallel to one another, the thickness of the separating walls at their thinnest parts amounting to about a half to a quarter of the width of the hollow space and the depth of the surface layer corresponding to the desired thickness of the layer to be made soft, said separating walls being substantially resilient.

2. A method of producing soft, flexible and yieldable outer surfaces of metal bodies consisting of hard non-yieldable material capable of being shaped by machining, said method comprising the steps of grooving outer surfaces of metal bodies until comparatively thin, resilient parallel, disc-like ribs of substantially the same diameter are formed, the grooves separating said ribs having a width which is a multiple of the thickness of the ribs, and then flattening circumferential edges of said ribs until they join each other to form a substantially smooth cylindrical surface extending over and at a distance from the bottoms of said grooves, whereby said grooves form completely enclosed annular cells.

3. A method of producing soft, flexible and yieldable outer surfaces of metal bodies consisting of hard non-yieldable material capable of being shaped by machining, said method comprising the steps of machining a substantially cylindrical surface to form a plurality of thin, resilient ribs with grooves located between said ribs, said grooves having a width which is a multiple of the thickness of the ribs, and then applying pressure against said ribs while rotating them at a high speed, said pressure being directed centrally substantially in the plane of said ribs, to flatten the edges of said ribs until they join each other to form a substantially smooth cylindrical surface extending over and at a distance from the bottoms of said grooves, whereby said grooves form completely enclosed annular cells.

GANDOLPH DOELTER.

REFERENCES CITED

The following references are of record in the file of this patent:

UNITED STATES PATENTS

| Number | Name | Date |
|---|---|---|
| 665,873 | Budd | Jan. 15, 1901 |
| 1,056,695 | Kroll | Mar. 18, 1913 |
| 1,311,160 | French | July 29, 1919 |
| 1,448,577 | Stull | Mar. 13, 1923 |
| 1,456,069 | Mallory | May 22, 1923 |
| 1,652,208 | McEvoy | Dec. 13, 1927 |
| 1,722,123 | Witherow | July 23, 1929 |
| 1,761,733 | Locke | June 3, 1930 |
| 1,902,779 | Hoffman | Mar. 21, 1933 |
| 2,036,034 | Fulmer | Mar. 31, 1936 |
| 2,169,937 | Wempe | Aug. 15, 1939 |
| 2,358,873 | Moss | Sept. 26, 1944 |
| 2,375,068 | Bennett | May 1, 1945 |
| 2,423,203 | Oldham | July 1, 1947 |
| 2,463,997 | Rodgers | Mar. 8, 1949 |